United States Patent
Zhou

(10) Patent No.: US 10,536,968 B2
(45) Date of Patent: Jan. 14, 2020

(54) SERVICE PROVIDER IDENTITY INDICATION METHOD AND DEVICE, USER EQUIPMENT AND ACCESS DEVICE

(71) Applicant: BAICELLS TECHNOLOGIES CO. LTD., Beijing (CN)

(72) Inventor: Mingyu Zhou, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 0 days.

(21) Appl. No.: 16/093,492

(22) PCT Filed: Apr. 14, 2017

(86) PCT No.: PCT/CN2017/080601
§ 371 (c)(1),
(2) Date: Oct. 12, 2018

(87) PCT Pub. No.: WO2017/177975
PCT Pub. Date: Oct. 19, 2017

(65) Prior Publication Data
US 2019/0132865 A1 May 2, 2019

(30) Foreign Application Priority Data
Apr. 15, 2016 (CN) .......................... 2016 1 0237638

(51) Int. Cl.
| H04W 74/00 | (2009.01) |
| H04W 72/04 | (2009.01) |
| H04W 74/08 | (2009.01) |
| H04L 27/20 | (2006.01) |
| H04L 5/00 | (2006.01) |

(Continued)

(52) U.S. Cl.
CPC .............. *H04W 74/004* (2013.01); *H04L 5/00* (2013.01); *H04L 5/0051* (2013.01); *H04L 5/0053* (2013.01); *H04L 27/2035* (2013.01); *H04L 27/2613* (2013.01); *H04W 48/08* (2013.01);

(Continued)

(58) Field of Classification Search
CPC . H04L 27/18; H04L 27/2035; H04L 27/2613; H04L 5/00; H04L 5/0051; H04L 5/0053; H04W 48/08; H04W 48/16; H04W 48/18; H04W 72/048; H04W 74/004; H04W 74/0833; H04W 74/0883; H04W 8/005
See application file for complete search history.

(56) References Cited

U.S. PATENT DOCUMENTS 10,349,238 B2 * 7/2019 Lu ........................... H04W 4/18
10,425,886 B2 * 9/2019 Zhou ..................... H04W 48/16
(Continued)

*Primary Examiner* — Ahmed Elallam
(74) *Attorney, Agent, or Firm* — Culhane Meadows PLLC; Stephen J. Weed

(57) ABSTRACT

The present disclosure provides an SP-ID indication method, an SP-ID indication device, a UE and an access device. The SP-ID indication method includes: transmitting, by a UE, an access request message to an access device through a PRACH, the access request message being at least used to indicate the quantity of PSP-IDs to be transmitted by the UE; and receiving, by the UE, resource information about uplink resources from the access device, the uplink resources being selected by the access device in accordance with the quantity of the PSP-IDs to be transmitted by the UE and used to transmit the PSP-IDs to be transmitted by the UE.

20 Claims, 5 Drawing Sheets

(51) Int. Cl.
  *H04W 48/08* (2009.01)
  *H04L 27/26* (2006.01)
  *H04L 27/18* (2006.01)

(52) U.S. Cl.
  CPC ........... *H04W 72/048* (2013.01); *H04L 27/18* (2013.01); *H04W 74/0883* (2013.01)

(56) References Cited

U.S. PATENT DOCUMENTS

2017/0034767 A1* 2/2017 Griot .................... H04W 76/14
2018/0376411 A1* 12/2018 Rinne ................... H04W 76/27
2019/0053046 A1* 2/2019 Zhou .................... H04W 48/14

* cited by examiner

SERVICE PROVIDER IDENTITY INDICATION METHOD AND DEVICE, USER EQUIPMENT AND ACCESS DEVICE

CROSS-REFERENCE TO RELATED APPLICATION

The present application is the U.S. national phase of PCT Application No. PCT/CN2017/080601 filed on Apr. 14, 2017, which claims a priority of the Chinese patent application 201610237638.6 filed on Apr. 15, 2016, which are incorporated herein by reference in their entirety.

TECHNICAL FIELD

The present disclosure relates to the field of communication technology, in particular to a Service Provider Identifier (SP-ID) indication method, an SP-ID indication device, a User Equipment (UE), and an access device.

BACKGROUND

MulteFire is an uplink transmission method newly defined on the basis of a Licensed-Assisted Access (LAA) downlink transmission method in a Long Term Evolution (LTE) Release 13 (R13), and it may operate individually at an unlicensed frequency spectrum (i.e., stand-alone LTE-U). The MulteFire may support one or both of two network modes (or network services), i.e., a Public Land Mobile Network (PLMN) access mode and a Neutral Host Network (NHN) access mode.

In order to support a plurality of service providers in a MulteFire network (e.g., an NHN network), i.e., to enable the plurality of service providers to provide services through the MulteFire network, Participating Service Provider Identity (PSP-IDs) have been introduced. The PSP-IDs are adopted to indicate different PSPs. For example, a plurality of PSP-IDs may be adopted to indicate a plurality of PSPs supported by a UE. However, the current research in the communication field focuses on how to report the PSP-IDs at a UE side, i.e., there is an urgent need to provide a scheme for reporting the PSP-IDs by the UE.

SUMMARY

An object of the present disclosure is to provide an SP-ID indication method, an SP-ID indication device and relevant devices, so as to enable a UE to report the PSP-IDs.

In one aspect, the present disclosure provides in some embodiments an SP-ID indication method, including: transmitting, by a UE, an access request message to an access device through a Physical Random Access Channel (PRACH), the access request message being at least used to indicate the quantity of PSP-IDs to be transmitted by the UE; and receiving, by the UE, resource information about uplink resources from the access device, the uplink resources being selected by the access device in accordance with the quantity of the PSP-IDs to be transmitted by the UE and used to transmit the PSP-IDs to be transmitted by the UE.

In some possible embodiments of the present disclosure, the access request message includes: a DeModulation Reference Signal (DMRS) sequence, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or indication information indicating the quantity of the PSP-IDs to be transmitted by the UE, the indication information being transmitted through one or more data symbols in the PRACH.

In some possible embodiments of the present disclosure, the indication information is carried in one or more Quadrature Phase Shift Keying (QPSK) symbols of the one or more data symbols in the PRACH, and/or the DMRS sequence is carried in one or more pilot symbols or the one or more data symbols in the PRACH.

In some possible embodiments of the present disclosure, the transmitting, by the UE, the access request message to the access device through the PRACH includes selecting, by the UE, an interlacing unit corresponding to the quantity of the PSP-IDs to be transmitted by the UE in accordance with a predetermined correspondence between an interlacing unit number and the quantity of the PSP-IDs, and transmitting the access request message to the access device through the PRACH corresponding to the selected interlacing unit.

In some possible embodiments of the present disclosure, the receiving, by the UE, the indication information about the uplink resources from the access device includes receiving, by the UE, a random access response message including the indication information about the uplink resources from the access device.

In another aspect, the present disclosure provides in some embodiments an SP-ID indication method, including: receiving, by an access device, an access request message transmitted by a UE through a PRACH, the access request message being at least used to indicate the quantity of PSP-IDs to be transmitted by the UE; selecting, by the access device, uplink resources in accordance with the quantity of the PSP-IDs to be transmitted by the UE, the uplink resources being used to transmit the PSP-IDs to be transmitted by the UE; and transmitting, by the access device, resource information about the uplink resources to the UE.

In some possible embodiments of the present disclosure, prior to selecting, by the access device, the uplink resources in accordance with the quantity of the PSP-IDs to be transmitted by the UE, the SP-ID indication method further includes: determining, by the access device, the quantity of the PSP-IDs to be transmitted by the UE in accordance with a DMRS sequence included in the access request message, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or determining the quantity of the PSP-IDs to be transmitted by the UE in accordance with indication information included in the access request message, the indication information being used to indicate the quantity of the PSP-IDs to be transmitted by the UE and transmitted through one or more data symbols in the PRACH.

In some possible embodiments of the present disclosure, the indication information is carried in one or more QPSK symbols of the one or more data symbols in the PRACH, and/or the DMRS sequence is carried in one or more pilot symbols or the one or more data symbols in the PRACH.

In some possible embodiments of the present disclosure, the receiving, by the access device, the access request message transmitted by the UE through the PRACH includes receiving, by the access device, the access request message transmitted by the UE through the PRACH corresponding to an interlacing unit, and an interlacing unit number corresponds to the quantity of the PSP-IDs. Prior to selecting, by the access device, the uplink resources in accordance with the quantity of the PSP-IDs to be transmitted by the UE, the SP-ID indication method further includes determining, by the access device, the quantity of the PSP-IDs to be transmitted by the UE corresponding to the selected interlacing unit in accordance with a correspondence between the interlacing unit number and the quantity of the PSP-IDs.

In some possible embodiments of the present disclosure, the transmitting, by the access device, the resource information about the uplink resources to the UE includes transmitting, by the access device, a random access response message including the indication information about the uplink resources to the UE.

In yet another aspect, the present disclosure provides in some embodiments an SP-ID indication device for use in a UE, including: a transmission module configured to transmit an access request message to an access device through a PRACH, the access request message being at least used to indicate the quantity of PSP-IDs to be transmitted by the UE; and a reception module configured to receive resource information about uplink resources from the access device, the uplink resources being selected by the access device in accordance with the quantity of the PSP-IDs to be transmitted by the UE and used to transmit the PSP-IDs to be transmitted by the UE.

In some possible embodiments of the present disclosure, the access request message includes: a DMRS sequence, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or indication information indicating the quantity of the PSP-IDs to be transmitted by the UE, the indication information being transmitted through one or more data symbols in the PRACH.

In some possible embodiments of the present disclosure, the indication information is carried in one or more QPSK symbols of the one or more data symbols in the PRACH, and/or the DMRS sequence is carried in one or more pilot symbols or the one or more data symbols in the PRACH.

In some possible embodiments of the present disclosure, the SP-ID indication device further includes a selection module configured to select an interlacing unit corresponding to the quantity of the PSP-IDs to be transmitted by the UE in accordance with a predetermined correspondence between an interlacing unit number and the quantity of the PSP-IDs, and the transmission module is further configured to transmit the access request message to the access device through the PRACH corresponding to the selected interlacing unit.

In some possible embodiments of the present disclosure, the reception module is further configured to receive a random access response message including the indication information about the uplink resources from the access device.

In still yet another aspect, the present disclosure provides in some embodiments a UE including the above-mentioned SP-ID indication device.

In still yet another aspect, the present disclosure provides in some embodiments an SP-ID indication device for use in an access device, including: a reception module configured to receive an access request message transmitted by a UE through a PRACH, the access request message being at least used to indicate the quantity of PSP-IDs to be transmitted by the UE; a selection module configured to select uplink resources in accordance with the quantity of the PSP-IDs to be transmitted by the UE, the uplink resources being used to transmit the PSP-IDs to be transmitted by the UE; and a transmission module configured to transmit resource information about the uplink resources to the UE.

In some possible embodiments of the present disclosure, the selection module is further configured to: determine the quantity of the PSP-IDs to be transmitted by the UE in accordance with a DMRS sequence included in the access request message, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or determine the quantity of the PSP-IDs to be transmitted by the UE in accordance with indication information included in the access request message, the indication information being used to indicate the quantity of the PSP-IDs to be transmitted by the UE and transmitted through one or more data symbols in the PRACH.

In some possible embodiments of the present disclosure, the indication information is carried in one or more QPSK symbols of the one or more data symbols in the PRACH, and/or the DMRS sequence is carried in one or more pilot symbols or the one or more data symbols in the PRACH.

In some possible embodiments of the present disclosure, the reception module is further configured to receive the access request message transmitted by the UE through the PRACH corresponding to an interlacing unit, and an interlacing unit number corresponds to the quantity of the PSP-IDs. The selection module is further configured to determine the quantity of the PSP-IDs to be transmitted by the UE corresponding to the selected interlacing unit in accordance with a correspondence between the interlacing unit number and the quantity of the PSP-IDs.

In some possible embodiments of the present disclosure, the transmission module is further configured to transmit a random access response message including the indication information about the uplink resources to the UE.

In still yet another aspect, the present disclosure provides in some embodiments an access device including the above-mentioned SP-ID indication device.

In still yet another aspect, the present disclosure provides in some embodiments an SP-ID indication device for use in a UE, including: a transmitter configured to transmit an access request message to an access device through a PRACH, the access request message being at least used to indicate the quantity of PSP-IDs to be transmitted by the UE; and a receiver configured to receive resource information about uplink resources from the access device, the uplink resources being selected by the access device in accordance with the quantity of the PSP-IDs to be transmitted by the UE and used to transmit the PSP-IDs to be transmitted by the UE.

In some possible embodiments of the present disclosure, the SP-ID indication device further includes a processor and a memory. The processor is configured to execute data or instructions stored in the memory, so as to select an interlacing unit corresponding to the quantity of the PSP-IDs to be transmitted by the UE in accordance with a predetermined correspondence between an interlacing unit number and the quantity of the PSP-IDs.

In still yet another aspect, the present disclosure provides in some embodiments an SP-ID indication device for use in an access device, including a receiver, a processor, a memory and a transmitter. The receiver is configured to receive an access request message transmitted by a UE through a PRACH, and the access request message is at least used to indicate the quantity of PSP-IDs to be transmitted by the UE. The processor is configured to execute data or instructions stored in the memory, so as to select uplink resources in accordance with the quantity of the PSP-IDs to be transmitted by the UE, and the uplink resources is used to transmit the PSP-IDs to be transmitted by the UE. The transmitter is configured to transmit resource information about the uplink resources to the UE.

In some possible embodiments of the present disclosure, the receiver is further configured to receive the access request message transmitted by the UE through the PRACH corresponding to an interlacing unit, and an interlacing unit number corresponds to the quantity of the PSP-IDs. The processor is further configured to execute the data or instructions stored in the memory, so as to determine the quantity of the PSP-IDs to be transmitted by the UE corresponding to the selected interlacing unit in accordance with a correspondence between the interlacing unit number and the quantity of the PSP-IDs.

According to the embodiments of the present disclosure, the UE transmits the access request message to the access device through the PRACH, and the access request message is at least used to indicate the quantity of the PSP-IDs to be transmitted by the UE. Then, the UE receives the resource information about the uplink resources from the access device, and the uplink resources are selected by the access device in accordance with the quantity of the PSP-IDs to be transmitted by the UE and used to transmit the PSP-IDs to be transmitted by the UE. As a result, it is able for the UE to report the PSP-IDs through the uplink resources.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, MulteFire may support a PLMN access mode and an NHN access mode. PSP-IDs have been introduced into an NHN network of the MulteFire so as to provide services by various SPs. and the schemes in the embodiments of the present disclosure may be applied to system architecture e.g., the NHN network. System architecture in the PLMN access mode and system architecture in the NHN access mode will be illustratively described hereinafter.

Figure 1:
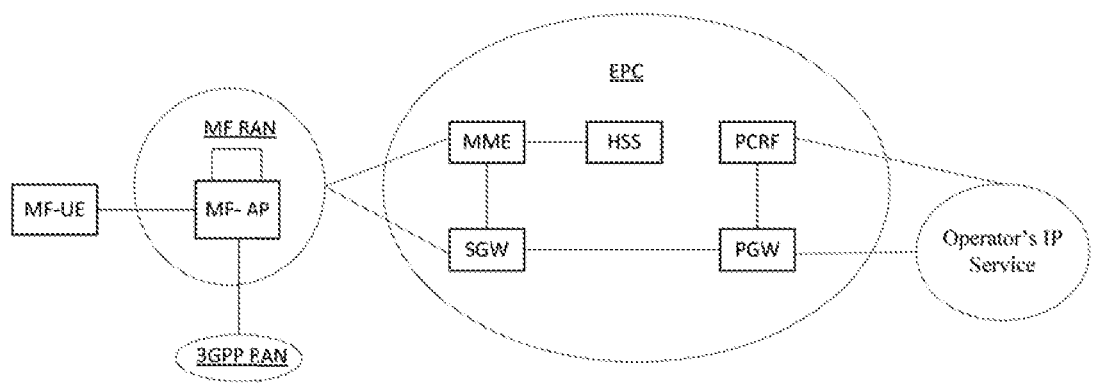
FIG. 1 is a schematic view showing conventional system architecture in a PLMN access mode.

The system architecture in the PLMN access mode is shown in FIG. 1, where a communication connection is established between a UE of the MulteFire and an Access Point (AP) in a Radio Access Network (RAN) of the MulteFire. MulteFire may be called as MF for short, the UE of the MulteFire may be called as MF-UE for short, and the AP in the RAN of the MulteFire may be called as MF-AP for short. Further, a communication connection may also be established between the RAN of the MulteFire and a Mobility Management Entity (MME) and a Serving Gateway (SGW) of an Evolved Packet Core (EPC) network. In addition, a communication connection may also be established between the RAN of the MulteFire and a $3^{rd}$-Generation Partnership Project (3GPP) RAN, and between the 3GPP RAN and the EPC network. In the EPC network, a communication connection may be established between the MME and a Home Subscriber Server (HSS), between the PGW and a Policy & Charging Rules Function (PCRF), and between each of the PGW and the PCRF and an Operator's Internet Protocol (IP) Services entity.

Figure 2:
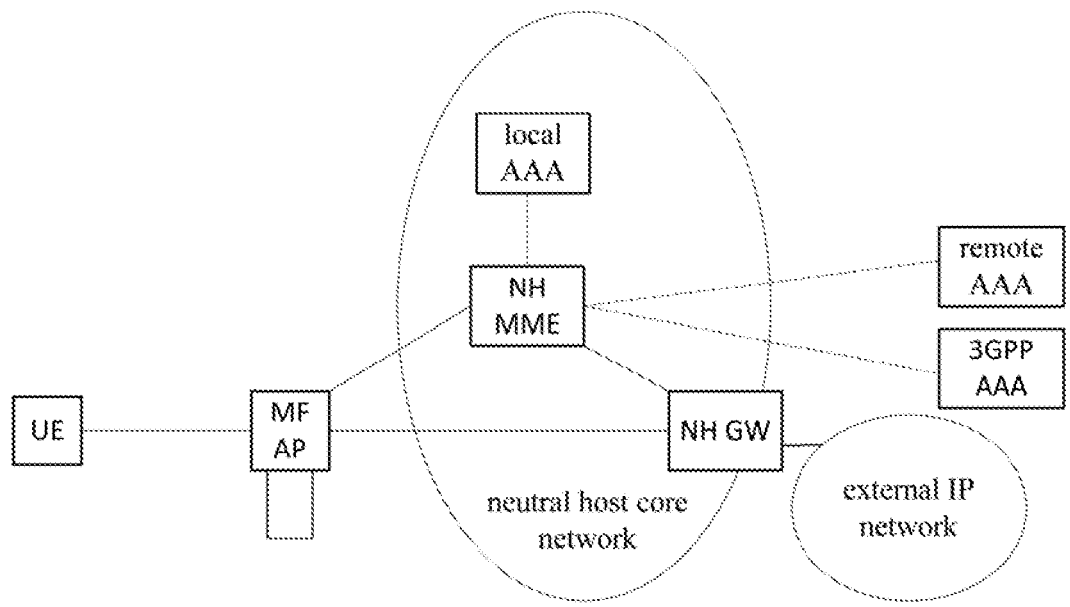
FIG. 2 is a schematic view showing conventional system architecture in an NHN access mode.

The system architecture in the NHN access mode is shown in FIG. 2, where a communication connection is established between the UE and the MF-AP, and between the MF-AP and each of an MME and a Gateway (GW) of a neutral host core network. The MME of the neutral host core network may be called as NH MME for short, and the GW of the neutral host core network may be called as IN GW for short. A communication connection may be established between the NH MME and a local Authentication, Authorization, Accounting (AAA) entity of the neutral host core network, between the NH MME and the NH GW, and between the NH MME and each of a remote AAA entity and a 3GPP AAA entity. In addition, a communication connection may also be established between the NH GW and an external IP network.

In the embodiments of the present disclosure, each PSP corresponds to one PSP-ID. The PSP may be understood as an SP participating in an MF network in the NHN mode, which includes, but not limited to, an Internet SP, a cable operator or company, a mobile network operator or company, or a public service provider.

In addition, the schemes in the embodiments of the present disclosure may be applied to a mobile communication system including, but not limited to, a Code Division Multiple Access 2000 (CDMA2000) system, a Wideband CDMA (WCDMA) system, a Time Division-Synchronous CDMA (TD-SCDMA) system, a Worldwide Interoperability for Microwave Access (WiMAX) system, an LTE/LTE-Advanced (LTE-A) system, an LAA system, an MF system, or a $5^{th}$-Generation (5G), $6^{th}$-Generation (6G) or Nth-Generation mobile communication system which may occur in the future. The MF system may be in the NHN access mode, or in a hybrid mode including both the NHN access mode and the PLMN access mode, which will not be particularly defined herein.

In addition, in the embodiments of the present disclosure, the UE may refer to a terminal-side product capable of supporting a communication protocol for a land mobile telecommunication system or a wireless modem for a special communication system, and it may be integrated in various terminals such as a mobile phone, a flat-panel computer or a data card so as to achieve a communication function. For example, the UE may be a mobile phone or any other device capable of transmitting or receiving a wireless signal, e.g., a Personal Digital Assistant (PDA), a wireless modem, a wireless communication device, a handheld device, a laptop computer, a cordless telephone, a Wireless Local Loop (WLL) station, a Customer Premise Equipment (CPE) or mobile intelligent hotspot capable of converting a mobile signal into a Wireless Fidelity (WiFi) signal, an intelligent household electrical appliance, or any other device capable of spontaneously communicating with a mobile communication network without being operated by a person.

In the embodiments of the present disclosure, the access device may be a base station or an AP. Of course, it should be appreciated that, various base stations may be adopted, e.g., macro base station, pico base station, Node B (3G mobile base station), evolved Node B (eNB), Femto eNB (or Home eNB (HeNB), relay, Remote Radio Unit (RRU), or Remote Radio Head (RRH).

Figure 3:
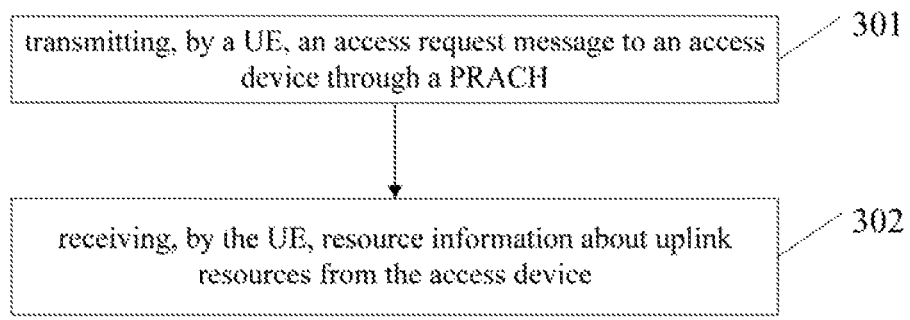
FIG. 3 is a flow chart of an SP-ID indication method according to some embodiments of the present disclosure.

The present disclosure provides in some embodiments an SP-ID indication method which, as shown in FIG. 3, includes the following steps.

Step 301: transmitting, by a UE, an access request message to an access device through a PRACH, the access request message being at least used to indicate the quantity of PSP-IDs to be transmitted by the UE.

In some possible embodiments of the present disclosure, the access request message may be an Msg1 message adopted during the establishment of Radio Resource Control (RRC) connection by the UE, e.g., a random access request message.

In addition, the PSP-IDs to be transmitted by the UE may be PSP-IDs each in a complete format or a compressed format which needs to be reported by the UE to the access device. Here, each PSP-ID may be an identity of a PSP supported by the UE.

Step 302: receiving, by the UE, resource information about uplink resources from the access device, the uplink resources being selected by the access device in accordance with the quantity of the PSP-IDs to be transmitted by the UE and used to transmit the PSP-IDs to be transmitted by the UE.

Upon the receipt of the access request message, the access device may determine the quantity of the PSP-IDs to be transmitted by the UE in accordance with the access request message, and select the uplink resources for the transmission of the PSP-IDs to be transmitted by the UE in accordance with the quantity of the PSP-IDs. In Step 302, the resource information about uplink grant resources in a random access response message may be received from the access device.

The uplink resources are selected by the access device in accordance with the quantity of the PSP-IDs to be transmitted by the UE, so it is able to select the appropriate uplink resources with respect to the quantity of the PSP-IDs, thereby to improve the reliability and efficiency of the transmission of the PSP-IDs. To be specific, the access device may further select the uplink resource of an appropriate size, e.g., an uplink (UL) grant resource of an appropriate size, in accordance with the quantity of the PSP-IDs as well as conventional power and path loss characteristics.

In addition, in the embodiments of the present disclosure, the uplink resource will not be particularly defined. For example, the uplink resource may be a resource for transmitting an RRC connection establishment request message, i.e., an Msg3 message, so as to transmit the PSP-ID in the Msg3 message. Also, the uplink resource may be an uplink resource capable of transmitting the other message, e.g., a resource for transmitting an Msg7 message, so as to transmit the PSP-ID in the Msg7 message.

According to the embodiments of the present disclosure, the UE transmits the access request message to the access device through the PRACH, and the access request message is at least used to indicate the quantity of the PSP-IDs to be transmitted by the UE. Then, the UE receives the resource information about the uplink resources from the access device, and the uplink resources are selected by the access device in accordance with the quantity of the PSP-IDs to be transmitted by the UE and used to transmit the PSP-IDs to be transmitted by the UE. As a result, it is able for the UE to report the PSP-IDs through the uplink resources.

Figure 4:
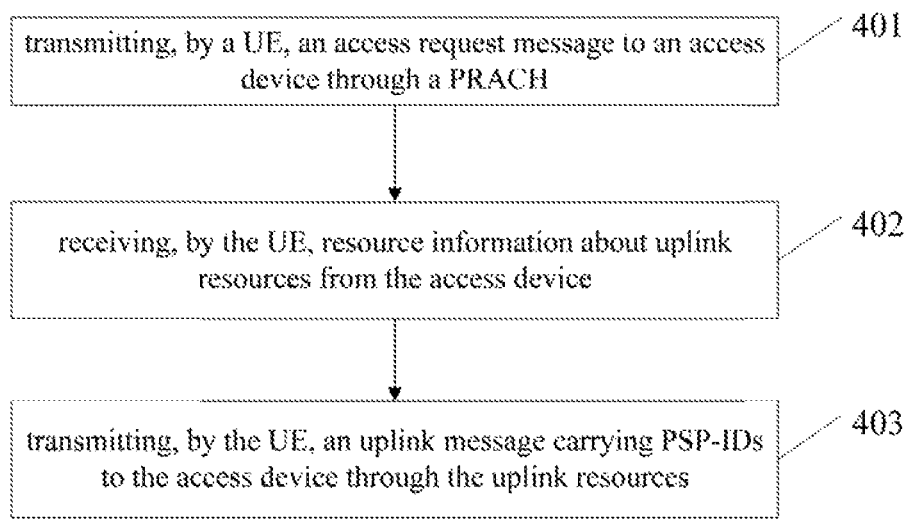
FIG. 4 is a flow chart of another SP-ID indication method according to some embodiments of the present disclosure.

The present disclosure further provides in some embodiments an SP-ID indication method which, as shown in FIG. 4, includes the following steps.

Step 401: transmitting, by a UE, an access request message to an access device through a PRACH, the access request message being at least used to indicate the quantity of PSP-IDs to be transmitted by the UE.

In some possible embodiments of the present disclosure, the access request message may include a DMRS sequence, i.e., the quantity of the PSP-IDs may be indicated through the DMRS sequence. There exists a correspondence between a DMRS sequence group to which the DMRS sequence belongs and the quantity of the PSP-IDs to be transmitted by the UE, and the quantity of the PSP-IDs to be transmitted by the UE may be determined by the access device in accordance with the correspondence. In some possible embodiments of the present disclosure, there exists a correspondence between the DMRS sequence and the quantity of the PSP-IDs to be transmitted by the UE, and the access device may determine the quantity of the PSP-IDs to be transmitted by the UE in accordance with the correspondence.

For example, the UE may transmit the DMRS sequence in the access request message in accordance with a predetermined correspondence between the DMRS sequence group to which the DMRS sequence belongs and the quantity of the PSP-IDs to be transmitted by the UE. For example, $[0:n]$ represents that there is no PSP-ID, i.e., the DMRS sequence having a serial number of 0 to n corresponds to 0 PSP-ID (namely there is no PSP-ID); $[n+1:m]$ represents that there are k or at most k number of PSP-IDs, i.e., the DMRS sequence having a serial number of n+1 to m corresponds to k number of PSP-IDs; and $[m+1:p]$ represents that there are q or at most q number of PSP-IDs, i.e., the DMRS sequence having a serial number of m+1 to p corresponds to q number of PSP-IDs, where n is an integer greater than or equal to 0, m is an integer greater than or equal to n+1, p is an integer greater than or equal to m+1, k is an integer greater than 0, and q is an integer greater than k. In this way, the corresponding DMRS sequence may be transmitted in the access request message in accordance with the correspondence, and identically the access device may determine the quantity of the PSP-IDs in accordance with the correspondence.

For another example, the UE may transmit the DMRS sequence in the access request message in accordance with a predetermined correspondence between the DMRS sequence and the quantity of the PSP-IDs to be transmitted by the UE. For example, based on the correspondence, different DMRS sequences may correspond to the PSP-IDs in different quantities. In this way, the corresponding DMRS sequence may be transmitted in the access request message in accordance with the correspondence, and identically the access device may determine the quantity of the PSP-IDs in accordance with the correspondence.

Figure 5:
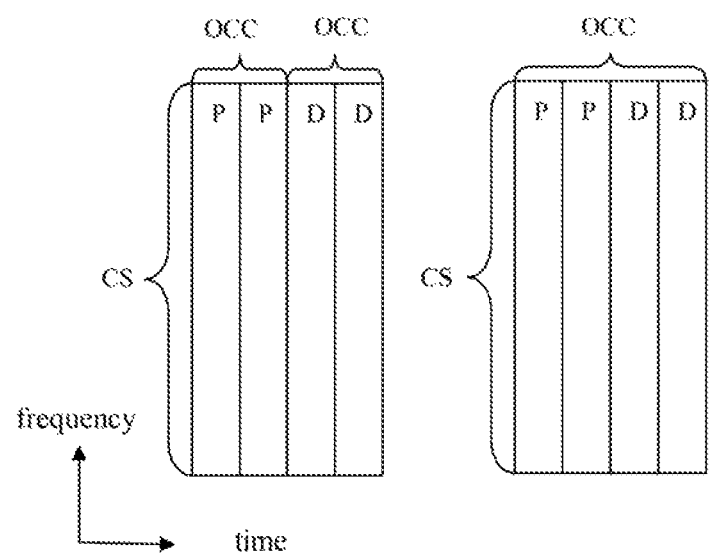
FIG. 5 is a schematic view showing a PRACH according to some embodiments of the present disclosure.

The following description will be given when the PRACH is a short Physical Uplink Control Channel (sPUCCH) in a format including four Block Interleaved FDMA (B-IFDMA) symbols PPDD, where P represents a pilot signal, and D represents a data signal. When all the four symbols are occupied by the PRACH, in each Physical Resource Block (PRB) of one interlacing unit, the symbols are orthogonal to each other through Cyclic Shift (CS) in a frequency domain, and orthogonal to each other through an Orthogonal Cover Code (OCC) in a time domain. For example, as indicated by a left part in FIG. 5, in each PRB of one interlacing unit, PP are orthogonal to each other through the OCC, and DD are orthogonal to each other through the OCC. DD may be adopted to transmit a designated QPSK symbol or a designated DMRS sequence. One interlacing unit may support at most 24 orthogonal sequences, and the sPUCCHs of different types may be multiplexed in a same interlacing unit, so it is able to transmit the DMRS sequence in the data symbol. For another example, as indicated by a right part in FIG. 5, when PPDD are orthogonal to each other through the OCC, the same DMRS sequence may be transmitted, and one interlacing unit may support at most 48 sequences. When merely the first two symbols, i.e., PI, are occupied by the PRACH, one interlacing unit may support at most 24 DMRS sequences. In this way, it is able to transmit the DMRS sequence in the pilot signal.

In some possible embodiments of the present disclosure, the access request message may include indication information indicating the quantity of the PSP-IDs to be transmitted by the UE, and the indication information may be transmitted through the data symbol in the PRACH.

In the embodiments of the present disclosure, the indication information may be transmitted through the data symbol, i.e., the access device may determine the quantity of the PSP-IDs in accordance with the information carried in the data symbol.

Figure 6:
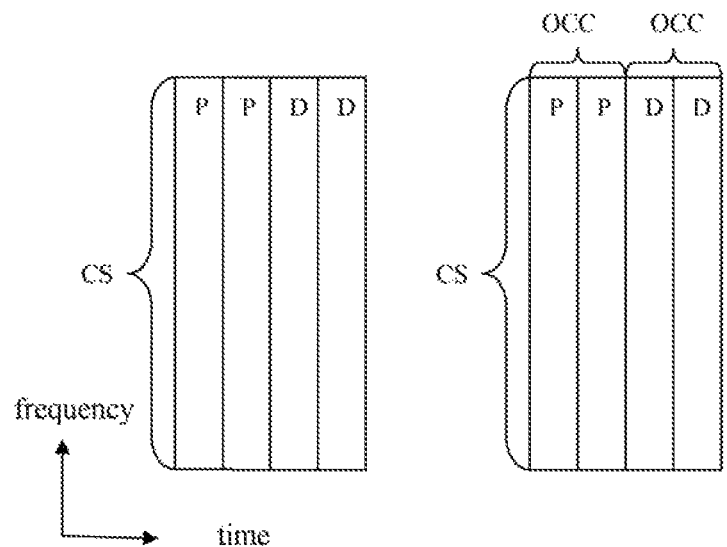
FIG. 6 is another schematic view showing the PRACH according to some embodiments of the present disclosure.

In some possible embodiments of the present disclosure, the indication information may be carried in the QPSK symbol of the data symbols in the PRACH, i.e., the indication information may be transmitted through the QPSK symbol of the data symbols. For example, when the PRACH contains the data symbols (D), the corresponding indication information may be carried in the QPSK symbol corresponding to each data symbol D. To be specific, the indication information may be encoded, and the encoded indication information and a Cyclic Redundancy Code (CRC) may be mapped to the QPSK symbols of one or more data symbols in a same interlacing unit for transmission. In addition, for the data symbols D in the PRACH, different formats correspond to the data symbols in different quantities. For example, when the B-IFDMA symbols PPDD in the PRACH are merely orthogonal to each other in the frequency domain through CS as indicated by a left part of FIG. 6, two QPSK symbols may be carried in a bandwidth of one PRB. When a system bandwidth is 20 MHz, one interlacing unit may include 10 PRBs for transmitting 40 bits, so as to carry the indication information and the CRC in the 40 bits. For another example, when the B-IFDMA symbols PP in the PRACH are orthogonal to each other through the OCC and the B-IFDMA symbols DD are orthogonal to each other through the OCC as indicated by a right part of FIG. 6, one QPSK symbol may be carried in a bandwidth of one PRB. When the system bandwidth is 20 MHz, one interlacing unit may include 10 PRBs, so it is able carry the indication information and the CRC in 20 bits.

It should be appreciated that, this implementation mode may be combined with the above-mentioned implementation mode concerning the DMRS sequence, i.e., the access request message may include both the DMRS sequence and the indication information. Of course, the two implementation modes may be achieved individually, i.e., the access request message may include the DMRS sequence or the indication information.

In some possible embodiments of the present disclosure, the transmitting, by the UE, the access request message to the access device through the PRACH may include selecting, by the UE, an interlacing unit corresponding to the quantity of the PSP-IDs to be transmitted by the UE in accordance with a predetermined correspondence between an interlacing unit number and the quantity of the PSP-IDs, and transmitting the access request message to the access device through the PRACH corresponding to the selected interlacing unit. The access device may then determine the quantity of the PSP-IDs to be transmitted by the UE corresponding to the interlacing unit in accordance with the predetermined correspondence between the interlacing unit number and the quantity of the PSP-IDs.

In the embodiments of the present disclosure, the PSP-IDs in different quantities may be reported through the PRACHs corresponding to different interlacing unit numbers. For example, for the system bandwidth of 20 MHz, 10 interlacing units are provided, and four different interlacing unit numbers corresponding to the PRACHs may be allocated at an access device side (e.g., the interlacing unit numbers 0, 1, 2 and 3 correspond to zero (0), one (1), two (2) and three (3) PSP-IDs respectively). In this way, the UE may select the corresponding interlacing unit number in accordance with the quantity of the PSP-IDs, and thereby transmit the access request message to the access device through the corresponding PRACH. For example, when three (3) PSP-IDs need to be transmitted by the UE, the UE may transmit the access request message to the access device through the PRACH corresponding to the interlacing unit number 3. Upon the detection of the access request message in the PRACH, the access device may determine the interlacing unit number corresponding to the PRACH, and then determine the quantity of the PSP-IDs.

It should be appreciated that, the correspondence between the interlacing unit number and the quantity of the PSP-IDs may be received by the UE from an access device in advance, but this access device may be the same as, or different from, the access device in Step 401, which will not be particularly defined herein.

In addition, in the embodiments of the present disclosure, the correspondences between the quantity of the PSP-IDs and each of the DMRS sequence, the indication information and the interlacing unit number may be adopted simultaneously, or the correspondence between the quantity of the PSP-IDs and the interlacing unit number may be adopted in conjunction with the above-mentioned implementation modes of the DMRS sequence or the indication information, so as to enable the access device to determine the quantity of the PSP-IDs more easily.

In some possible embodiments of the present disclosure, the DMRS sequence and/or the indication information may also be used to indicate information related to the PSP-IDs. For example, the DMRS sequence and/or the indication information may be used to indicate the access device to broadcast, in a multicasting or unicasting manner, the PSP-IDs which have currently not been broadcast. At this time, it is able to indicate the quantity of the PSP-IDs through the DMRS sequence and the indication information simultaneously, and indicate the PSP-IDs which have not been broadcast through the access device in a multicasting or unicasting manner. For another example, the DMRS sequence and/or the indication information may be used to indicate serial numbers of the PSP-IDs which have already been broadcast. At this time, it is able to indicate the quantity of the PSP-IDs through the DMRS sequence and the indication information simultaneously, and indicate the serial numbers of the PSP-IDs which have already been broadcast.

In this way, it is able to indicate more information about the PSP-IDs through the DMRS sequence and/or the indication information without any additional step, thereby to save the transmission resources.

Step 402: receiving, by the UE, resource information about uplink resources from the access device, the uplink resources being selected by the access device in accordance with the quantity of the PSP-IDs to be transmitted by the UE and used to transmit the PSP-IDs to be transmitted by the UE.

In some possible embodiments of the present disclosure, the receiving, by the UE, the indication information about the uplink resources from the access device may include receiving, by the UE, a random access response message including the indication information about the uplink resources from the access device.

In this way, it is able to report to the access device the quantity of the PSP-IDs to be transmitted by the UE during the transmission of the access request message.

In some possible embodiments of the present disclosure, the SP-ID indication method may further include Step 403 of transmitting, by the UE, an uplink message carrying the PSP-IDs to the access device through the uplink resources.

Here, the uplink message may be an Msg3 message during the RRC connection establishment, or an uplink message to be used in any other scenarios, which will not be particularly defined herein. In addition, the PSP-IDs transmitted in this step are just the above-mentioned PSP-IDs to be transmitted by the UE. The quantity of the PSP-IDs to be transmitted may be one or more, or even zero (0) in some scenarios.

As compared with the SP-ID indication method in FIG. 3, a plurality of possible implementation modes is provided in the SP-ID indication method in FIG. 4, with a same technical effect of reporting the PSP-IDs by the UE.

Figure 7:
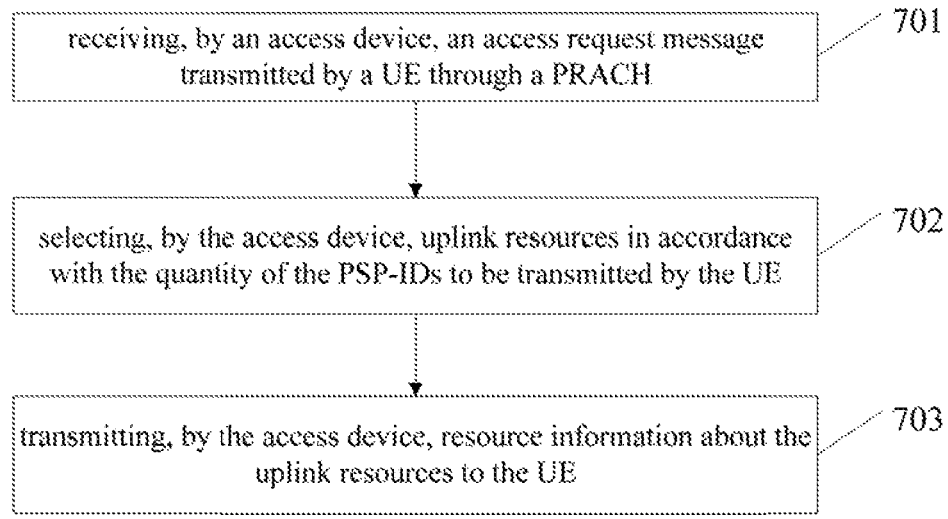
FIG. 7 is a flow chart of yet another SP-ID indication method according to some embodiments of the present disclosure.

The present disclosure further provides in some embodiments an SP-ID indication method which, as shown in FIG. 7, includes the following steps.

Step 701: receiving, by an access device, an access request message transmitted by a UE through a PRACH, the access request message being at least used to indicate the quantity of PSP-IDs to be transmitted by the UE. The description about the access request message may refer to that mentioned in the embodiments as shown in FIG. 3 and FIG. 4, and thus will not be particularly defined herein.

Step 702: selecting, by the access device, uplink resources in accordance with the quantity of the PSP-IDs to be transmitted by the UE, the uplink resources being used to transmit the PSP-IDs to be transmitted by the UE. The description about the uplink resources may refer to that mentioned in the embodiments as shown in FIG. 3 and FIG. 4, and thus will not be particularly defined herein.

Step 703: transmitting, by the access device, resource information about the uplink resources to the UE.

In some possible embodiments of the present disclosure, the access request message may include a DMRS sequence and/or indication information. There exists a correspondence between a DMRS sequence group to which the DMRS sequence belongs and the quantity of the PSP-IDs to be transmitted by the UE, and the access device may determine the quantity of the PSP-IDs to be transmitted by the UE in accordance with the correspondence; or there is a correspondence between the DMRS sequence and the quantity of the PSP-IDs to be transmitted by the UE, and the access device may determine the quantity of the PSP-IDs to be transmitted by the UE in accordance with the correspondence. The indication information is used to indicate the quantity of the PSP-IDs to be transmitted by the UE and transmitted through one or more data symbols in the PRACH. The description about the DMRS sequence and the indication information may refer to that mentioned in the embodiments as shown in FIGS. 3 and 4, and thus will not be particularly defined herein.

In some possible embodiments of the present disclosure, the indication information may be carried in one or more QPSK symbols of the one or more data symbols in the PRACH. The description about the QPSK symbol may refer to that mentioned in the embodiments as shown in FIG. 3 and FIG. 4, and thus will not be particularly defined herein.

In some possible embodiments of the present disclosure, the receiving, by the access device, the access request message transmitted by the UE through the PRACH may include receiving, by the access device, the access request message transmitted by the UE through the PRACH corresponding to an interlacing unit, and the interlacing unit is selected by the UE in accordance with a predetermined correspondence between an interlacing unit number and the quantity of the PSP-IDs and corresponds to the quantity of the PSP-IDs to be transmitted by the UE. Prior to selecting, by the access device, the uplink resources in accordance with the quantity of the PSP-IDs to be transmitted by the UE, the SP-ID indication method may further include determining, by the access device, the quantity of the PSP-IDs to be transmitted by the UE corresponding to the selected interlacing unit in accordance with the correspondence between the interlacing unit number and the quantity of the PSP-IDs. The description on the correspondence and the determination of the quantity of the PSP-IDs may refer to that mentioned in the embodiments as shown in FIGS. 3 and 4, and thus will not be particularly defined herein.

In some possible embodiments of the present disclosure, the transmitting, by the access device, the resource information about the uplink resources to the UE may include transmitting, by the access device, a random access response message including the indication information about the uplink resources to the UE.

According to the embodiments of the present disclosure, the access device receives the access request message from the UE through the PRACH, and the access request message is at least used to indicate the quantity of the PSP-IDs to be transmitted by the UE. Next, the access device selects the uplink resources in accordance with the quantity of the PSP-IDs to be transmitted by the UE, and the uplink resources are used to transmit the PSP-IDs to be transmitted by the UE. Then, the access device transmits the resource information about the uplink resources to the UE. As a result, it is able for the UE to report the PSP-IDs through the uplink resources.

Figure 8:
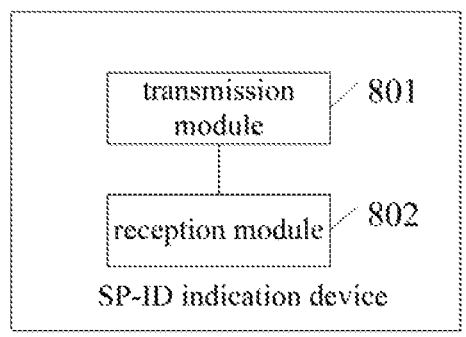
FIG. 8 is a schematic view showing an SP-ID indication device according to some embodiments of the present disclosure.

The present disclosure further provides in some embodiments an SP-ID indication device for use in a UE. As shown in FIG. 8, the SP-ID indication device includes: a transmission module 801 configured to transmit an access request message to an access device through a PRACH, the access request message being at least used to indicate the quantity of PSP-IDs to be transmitted by the UE; and a reception module 802 configured to receive resource information about uplink resources from the access device, the uplink resources being selected by the access device in accordance with the quantity of the PSP-IDs to be transmitted by the UE and used to transmit the PSP-IDs to be transmitted by the UE.

In some possible embodiments of the present disclosure, the access request message may include a DMRS sequence and/or indication information. There exists a correspondence between a DMRS sequence group to which the DMRS sequence belongs and the quantity of the PSP-IDs to be transmitted by the UE, and the access device may determine the quantity of the PSP-IDs to be transmitted by the UE in accordance with the correspondence; or there is a correspondence between the DMRS sequence and the quantity of the PSP-IDs to be transmitted by the UE, and the access device may determine the quantity of the PSP-IDs to be transmitted by the UE in accordance with the correspondence. The indication information is used to indicate the quantity of the PSP-IDs to be transmitted by the UE and transmitted through one or more data symbols in the PRACH.

In some possible embodiments of the present disclosure, the indication information may be carried in one or more QPSK symbols of the one or more data symbols in the PRACH, and/or the DMRS sequence may be carried in one or more pilot symbols or the one or more data symbols in the PRACH.

In some possible embodiments of the present disclosure, the SP-ID indication device may further include a selection module configured to select an interlacing unit corresponding to the quantity of the PSP-IDs to be transmitted by the UE in accordance with a predetermined correspondence between an interlacing unit number and the quantity of the PSP-IDs, and the transmission module 801 may be further configured to transmit the access request message to the access device through the PRACH corresponding to the selected interlacing unit. Correspondingly, the access device may determine the quantity of the PSP-IDs to be transmitted by the UE corresponding to the interlacing unit in accordance with the correspondence between the interlacing unit number and the quantity of the PSP-IDs.

In some possible embodiments of the present disclosure, the reception module 802 may be further configured to receive a random access response message including the indication information about the uplink resources from the access device.

In the embodiments of the present disclosure, the SP-ID indication device is capable of executing the procedures executed by the UE in the method embodiments in FIG. 3 through FIG. 7 with a same beneficial effect, which will not be particularly defined herein.

The present disclosure further provides in some embodiments a UE including the SP-ID indication device in FIG. 8.

The UE may be a terminal-side product capable of supporting a communication protocol for a land mobile telecommunication system or a wireless modem for a special communication system, and it may be integrated in various terminals such as a mobile phone, a flat-panel computer or a data card so as to achieve a communication function. For example, the UE may be a mobile phone or any other device capable of transmitting or receiving a wireless signal, e.g., a PDA, a wireless modem, a wireless communication device, a handheld device, a laptop computer, a cordless telephone, a WLL station, a CPE or mobile intelligent hotspot capable of converting a mobile signal into a WiFi signal, an intelligent household electrical appliance, or any other device capable of spontaneously communicating with a mobile communication network without being operated by a person.

Figure 9:
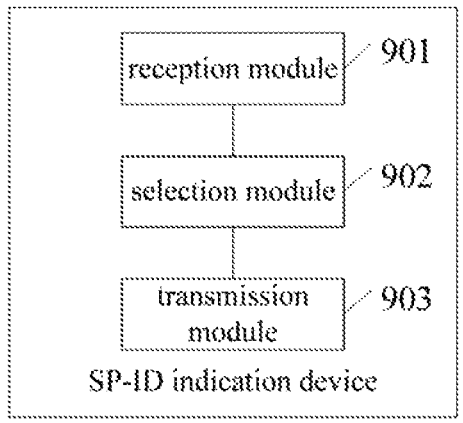
FIG. 9 is a schematic view showing another SP-ID indication device according to some embodiments of the present disclosure.

The present disclosure further provides in some embodiments an SP-ID indication device for use in an access device. As shown in FIG. 9, the SP-ID indication device includes: a reception module 901 configured to receive an access request message transmitted by a UE through a PRACH, the access request message being at least used to indicate the quantity of PSP-IDs to be transmitted by the UE; a selection module 902 configured to select uplink resources in accordance with the quantity of the PSP-IDs to be transmitted by the UE, the uplink resources being used to transmit the PSP-JDs to be transmitted by the UE; and a transmission module 903 configured to transmit resource information about the uplink resources to the UE.

In some possible embodiments of the present disclosure, the selection module 902 may be further configured to: determine the quantity of the PSP-IDs to be transmitted by the UE in accordance with a DMRS sequence included in the access request message; and/or determine the quantity of the PSP-IDs to be transmitted by the UE in accordance with indication information included in the access request message. To be specific, there exists a correspondence between a DMRS sequence group to which the DMRS sequence belongs and the quantity of the PSP-IDs to be transmitted by the UE, and the selection module 902 may be further configured to determine the quantity of the PSP-IDs in accordance with the correspondence; or there exists a correspondence between the DMRS sequence and the quantity of the PSP-IDs to be transmitted by the UE, and the selection module 902 may be further configured to determine the quantity of the PSP-IDs in accordance with the correspondence. In addition, the indication information is used to indicate the quantity of the PSP-IDs to be transmitted by the UE and transmitted through one or more data symbols in the PRACH.

In some possible embodiments of the present disclosure, the indication information may be carried in one or more QPSK symbols of the one or more data symbols in the PRACH, and/or the DMRS sequence may be carried in one or more pilot symbols or the one or more data symbols in the PRACH.

In some possible embodiments of the present disclosure, the reception module 901 may be further configured to receive the access request message transmitted by the UE through the PRACH corresponding to an interlacing unit, and the interlacing unit is selected by the UE in accordance with a predetermined correspondence between an interlacing unit number and the quantity of the PSP-IDs and corresponds to the quantity of the PSP-IDs to be transmitted by the UE. The selection module 902 may be further configured to determine the quantity of the PSP-IDs to be transmitted by the UE corresponding to the selected interlacing unit in accordance with the correspondence between the interlacing unit number and the quantity of the PSP-IDs, and select the uplink resources in accordance with the quantity of the PSP-IDs to be transmitted by the UE.

In some possible embodiments of the present disclosure, the transmission module 903 may be further configured to transmit a random access response message including the indication information about the uplink resources to the UE.

In the embodiments of the present disclosure, the SP-ID indication device is capable of executing the procedures executed by the access device in the method embodiments in FIG. 3 through FIG. 7 with a same beneficial effect, which will not be particularly defined herein.

The present disclosure further provides in some embodiments an access device including the SP-ID indication device in FIG. 9. The access device may be a base station or an AP. Of course, it should be appreciated that, various base stations may be adopted, e.g., macro base station, pico base station, Node B (3G mobile base station), eNB, Femto eNB (or HeNB), relay, RRU, or RRH.

It should be appreciated that, the embodiments of the present disclosure, the serial numbers of the steps are not used to represent the order of the steps, i.e., the order of the steps shall be determined in accordance with the functions and the internal logic but shall not be used to define the scope of the present disclosure. In addition, the terms "system" and "network" may be replaced with each other in the context.

Figure 10:
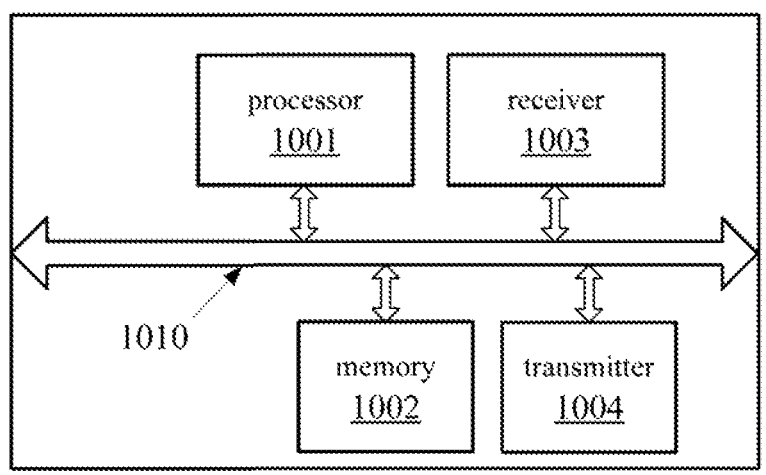
FIG. 10 is a schematic view showing a device according to some embodiments of the present disclosure.

The above steps may be implemented by a device in FIG. 10. The device includes a processor 1001, a memory 1002, a receiver 1003 and a transceiver 1004. The processor 1001 is configured to control operations of the device. The memory 1001 may include a Read-Only Memory (ROM) or a Random Access Memory (RAM), and it is configured to store therein data and instructions for the operation of the processor 1001. The processor 1001, the memory 1002, the receiver 1003 and the transceiver 1004 are coupled together through a bus system 1010. Apart from a data bus, the bus system 101 may further include a power source bus, a control bus and a state signal bus. For clarification, all the buses in FIG. 10 are marked as the bus system 1010.

The processor 1001 may be an integrated circuit (IC) chip having a signal processing capability. During the implementation, the steps of the above-mentioned methods may be completed through an integrated logic circuit of hardware in the processor 1001 or through instructions in the form of software. The processor 1001 may be a general-purpose processor, including a Central Processing Unit (CPU), a Network Processor (NP), a Digital Signal Processor (DSP), an Application-Specific Integrated Circuit (ASIC), a Field Programmable Gate Array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor.

The present disclosure further provides in some embodiments an SP-ID indication device for use in a UE, including: a transmitter configured to transmit an access request message to an access device through a PRACH, the access request message being at least used to indicate the quantity of PSP-IDs to be transmitted by the UE; and a receiver configured to receive resource information about uplink resources from the access device, the uplink resources being selected by the access device in accordance with the quantity of the PSP-IDs to be transmitted by the UE and used to transmit the PSP-IDs to be transmitted by the UE.

In some possible embodiments of the present disclosure, the SP-ID indication device may further include a processor and a memory. The processor is configured to execute data or instructions stored in the memory, so as to select an interlacing unit corresponding to the quantity of the PSP-IDs to be transmitted by the UE in accordance with a predetermined correspondence between an interlacing unit number and the quantity of the PSP-IDs.

In the embodiments of the present disclosure, the SP-ID indication device is capable of executing the procedures executed by the UE in the method embodiments in FIG. 3 through FIG. 7 with a same beneficial effect, which will not be particularly defined herein.

The present disclosure further provides in some embodiments an SP-ID) indication device for use in an access device, including a receiver, a processor, a memory and a transmitter. The receiver is configured to receive an access request message transmitted by a UE through a PRACH, and the access request message is at least used to indicate the quantity of PSP-IDs to be transmitted by the UE. The processor is configured to execute data or instructions stored in the memory, so as to select uplink resources in accordance with the quantity of the PSP-IDs to be transmitted by the UE, and the uplink resources is used to transmit the PSP-IDs to be transmitted by the UE. The transmitter is configured to transmit resource information about the uplink resources to the UE.

In the embodiments of the present disclosure, the SP-ID indication device is capable of executing the procedures executed by the access device in the method embodiments in FIG. 3 through FIG. 7 with a same beneficial effect, which will not be particularly defined herein.

It should be appreciated that, the expression "and/or" is merely used to describe the relationship between objects, and it may include three relationships. For example, "A and/or B" may be used to represent that, there is only A, there are both A and B, and there is only B. Further, the symbol "/" usually refers to "or".

It should be further appreciated that, the expression "B corresponding to A" may be used to represent that B is associated with A and B may be determined in accordance with A. However, it should be further appreciated that, when B is determined in accordance with A, it does not mean that B is merely determined in accordance with A, and instead, B may be determined in accordance with A and/or any other information.

It should be further appreciated that, the device and method may be implemented in any other ways. For example, the embodiments for the device are merely for illustrative purposes, and the units are provided merely on the basis of their logic functions. During the actual application, some units or assemblies may be combined together or integrated into another system. Alternatively, some functions of the units or assemblies may be omitted or not executed. In addition, the coupling connection, direct coupling connection or communication connection between the units may be implemented via interfaces, and the indirect coupling connection or communication connection between the units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

A1. An SP-ID indication method, including: transmitting, by a UE, an access request message to an access device through a PRACH, the access request message being at least used to indicate the quantity of PSP-IDs to be transmitted by the UE; and receiving, by the UE, resource information about uplink resources from the access device, the uplink resources being selected by the access device in accordance with the quantity of the PSP-IDs to be transmitted by the UE and used to transmit the PSP-IDs to be transmitted by the UE.

A2. The SP-ID indication method according to A 1, wherein the access request message includes: a DMRS sequence, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or indication information indicating the quantity of the PSP-IDs to be transmitted by the UE, the indication information being transmitted through one or more data symbols in the PRACH.

A3. The SP-ID indication method according to A2, wherein the indication information is carried in one or more QPSK symbols of the one or more data symbols in the PRACH, and/or the DMRS sequence is carried in one or more pilot symbols or the one or more data symbols in the PRACH.

A4. The SP-ID indication method according to any one of A1 to A3, wherein the transmitting, by the UE, the access request message to the access device through the PRACH includes selecting, by the UE, an interlacing unit corresponding to the quantity of the PSP-IDs to be transmitted by the UE in accordance with a predetermined correspondence between an interlacing unit number and the quantity of the PSP-IDs, and transmitting the access request message to the access device through the PRACH corresponding to the selected interlacing unit.

A5. The SP-ID indication method according to any one of A1 to A4, wherein the receiving, by the UE, the indication information about the uplink resources from the access device includes receiving, by the UE, a random access response message including the indication information about the uplink resources from the access device.

B6. An SP-ID indication method, including: receiving, by an access device, an access request message transmitted by a UE through a PRACH, the access request message being at least used to indicate the quantity of PSP-IDs to be transmitted by the UE; selecting, by the access device, uplink resources in accordance with the quantity of the PSP-IDs to be transmitted by the UE, the uplink resources being used to transmit the PSP-IDs to be transmitted by the UE; and transmitting, by the access device, resource information about the uplink resources to the UE.

B7. The SP-ID indication method according to B6, wherein prior to selecting, by the access device, the uplink resources in accordance with the quantity of the PSP-IDs to be transmitted by the UE, the SP-ID indication method further includes: determining, by the access device, the quantity of the PSP-IDs to be transmitted by the UE in accordance with a DMRS sequence included in the access request message, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or determining the quantity of the PSP-IDs to be transmitted by the UE in accordance with indication information included in the access request message, the indication information being used to indicate the quantity of the PSP-IDs to be transmitted by the UE and transmitted through one or more data symbols in the PRACH.

B8. The SP-ID indication method according to B7, wherein the indication information is carried in one or more QPSK symbols of the one or more data symbols in the PRACH, and/or the DMRS sequence is carried in one or more pilot symbols or the one or more data symbols in the PRACH.

B9. The SP-ID indication method according to any one of B6 to B8, wherein the receiving, by the access device, the access request message transmitted by the UE through the PRACH includes receiving, by the access device, the access request message transmitted by the UE through the PRACH corresponding to an interlacing unit, and an interlacing unit number corresponds to the quantity of the PSP-IDs, wherein prior to selecting, by the access device, the uplink resources in accordance with the quantity of the PSP-IDs to be transmitted by the UE, the SP-ID indication method further includes determining, by the access device, the quantity of the PSP-IDs to be transmitted by the UE corresponding to the selected interlacing unit in accordance with a correspondence between the interlacing unit number and the quantity of the PSP-IDs.

B10. The SP-ID indication method according to any one of B6 to B9, wherein the transmitting, by the access device, the resource information about the uplink resources to the UE includes transmitting, by the access device, a random access response message including the indication information about the uplink resources to the UE.

C11. An SP-ID indication device for use in a UE, including: a transmission module configured to transmit an access request message to an access device through a PRACH, the access request message being at least used to indicate the quantity of PSP-IDs to be transmitted by the UE; and a reception module configured to receive resource information about uplink resources from the access device, the uplink resources being selected by the access device in accordance with the quantity of the PSP-IDs to be transmitted by the UE and used to transmit the PSP-IDs to be transmitted by the UE.

C12. The SP-ID indication device according to C11, wherein the access request message includes: a DMRS sequence, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or indication information indicating the quantity of the PSP-IDs to be transmitted by the UE, the indication information being transmitted through one or more data symbols in the PRACH.

C13. The SP-ID indication device according to C12, wherein the indication information is carried in one or more QPSK symbols of the one or more data symbols in the PRACH, and/or the DMRS sequence is carried in one or more pilot symbols or the one or more data symbols in the PRACH.

C14. The SP-ID indication device according to any one of C11 to C13, further including a selection module configured to select an interlacing unit corresponding to the quantity of the PSP-IDs to be transmitted by the UE in accordance with a predetermined correspondence between an interlacing unit number and the quantity of the PSP-IDs, wherein the transmission module is further configured to transmit the access request message to the access device through the PRACH corresponding to the selected interlacing unit.

C15. The SP-ID indication device according to any one of C11 to C14, wherein the reception module is further configured to receive a random access response message including the indication information about the uplink resources from the access device.

D16. A User Equipment (UE), including the SP-ID indication device according to any one of C11 to C15.

E17. An SP-ID indication device for use in an access device, including: a reception module configured to receive an access request message transmitted by a UE through a PRACH, the access request message being at least used to indicate the quantity of PSP-IDs to be transmitted by the UE; a selection module configured to select uplink resources in accordance with the quantity of the PSP-IDs to be transmitted by the UE, the uplink resources being used to transmit the PSP-IDs to be transmitted by the UE; and a transmission module configured to transmit resource information about the uplink resources to the UE.

E18. The SP-ID indication device according to E17, wherein the selection module is further configured to: determine the quantity of the PSP-IDs to be transmitted by the UE in accordance with a DMRS sequence included in the access request message, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or determine the quantity of the PSP-IDs to be transmitted by the UE in accordance with indication information included in the access request message, the indication information being used to indicate the quantity of the PSP-IDs to be transmitted by the UE and transmitted through one or more data symbols in the PRACH.

E19. The SP-ID indication device according to E18, wherein the indication information is carried in one or more QPSK symbols of the one or more data symbols in the PRACH, and/or the DMRS sequence is carried in one or more pilot symbols or the one or more data symbols in the PRACH.

E20. The SP-ID indication device according to any one of E17 to E19, wherein the reception module is further configured to receive the access request message transmitted by the UE through the PRACH corresponding to an interlacing unit, and an interlacing unit number corresponds to the quantity of the PSP-IDs, and the selection module is further configured to determine the quantity of the PSP-IDs to be transmitted by the UE corresponding to the selected interlacing unit in accordance with a correspondence between the interlacing unit number and the quantity of the PSP-IDs.

E21. The SP-ID indication device according to any one of E17 to E20, wherein the transmission module is further configured to transmit a random access response message including the indication information about the uplink resources to the UE.

F22. An access device, including the SP-ID indication device according to any one of E17 to E21.

What is claimed is:

1. A Service Provider Identity (SP-ID) indication method comprising:
    transmitting, by a User Equipment (UE), an access request message to an access device through a Physical Random Access Channel (PRACH), the access request message being at least used to indicate the quantity of Participating Service Provide Identities (PSP-IDs) to be transmitted by the UE; and
    receiving, by the UE, resource information about uplink resources from the access device, the uplink resources being selected by the access device in accordance with the quantity of the PSP-IDs to be transmitted by the UE and used to transmit the PSP-IDs to be transmitted by the UE.

2. The SP-ID indication method according to claim 1, wherein the access request message comprises:
    a Demodulation Reference Signal (DMRS) sequence, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or
    indication information indicating the quantity of the PSP-IDs to be transmitted by the UE, the indication information being transmitted through one or more data symbols in the PRACH.

3. The SP-ID indication method according to claim 2, wherein the indication information is carried in one or more Quadrature Phase Shift Keying (QPSK) symbols of the one or more data symbols in the PRACH, and/or the DMRS sequence is carried in one or more pilot symbols or the one or more data symbols in the PRACH.

4. The SP-ID indication method according to claim 1, wherein the transmitting, by the UE, the access request message to the access device through the PRACH comprises selecting, by the UE, an interlacing unit corresponding to the quantity of the PSP-IDs to be transmitted by the UE in accordance with a predetermined correspondence between an interlacing unit number and the quantity of the PSP-IDs, and transmitting the access request message to the access device through the PRACH corresponding to the selected interlacing unit.

5. The SP-ID indication method according to claim 1, wherein the receiving, by the UE, the indication information about the uplink resources from the access device comprises receiving, by the UE, a random access response message comprising the indication information about the uplink resources from the access device.

6. An SP-ID indication method comprising:
    receiving, by an access device, an access request message transmitted by a UE through a PRACH, the access request message being at least used to indicate the quantity of PSP-IDs to be transmitted by the UE;
    selecting, by the access device, uplink resources in accordance with the quantity of the PSP-IDs to be transmitted by the UE, the uplink resources being used to transmit the PSP-IDs to be transmitted by the UE; and
    transmitting, by the access device, resource information about the uplink resources to the UE.

7. The SP-ID indication method according to claim 6, wherein prior to selecting, by the access device, the uplink resources in accordance with the quantity of the PSP-IDs to be transmitted by the UE, the SP-ID indication method further comprises:
  determining, by the access device, the quantity of the PSP-IDs to be transmitted by the UE in accordance with a DMRS sequence comprised in the access request message, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or
  determining the quantity of the PSP-IDs to be transmitted by the UE in accordance with indication information comprised in the access request message, the indication information being used to indicate the quantity of the PSP-IDs to be transmitted by the UE and transmitted through one or more data symbols in the PRACH.

8. The SP-ID indication method according to claim 7, wherein the indication information is carried in one or more QPSK symbols of the one or more data symbols in the PRACH, and/or the DMRS sequence is carried in one or more pilot symbols or the one or more data symbols in the PRACH.

9. The SP-ID indication method according to claim 6, wherein the receiving, by the access device, the access request message transmitted by the UE through the PRACH comprises receiving, by the access device, the access request message transmitted by the UE through the PRACH corresponding to an interlacing unit, and an interlacing unit number corresponds to the quantity of the PSP-IDs,
  wherein prior to selecting, by the access device, the uplink resources in accordance with the quantity of the PSP-IDs to be transmitted by the UE, the SP-ID indication method further comprises determining, by the access device, the quantity of the PSP-IDs to be transmitted by the UE corresponding to the selected interlacing unit in accordance with a correspondence between the interlacing unit number and the quantity of the PSP-IDs.

10. The SP-ID indication method according to claim 6, wherein the transmitting, by the access device, the resource information about the uplink resources to the UE comprises transmitting, by the access device, a random access response message comprising the indication information about the uplink resources to the UE.

11. An SP-ID indication device for use in a UE, comprising:
  a transmitter configured to transmit an access request message to an access device through a PRACH, the access request message being at least used to indicate the quantity of PSP-IDs to be transmitted by the UE; and
  a receiver configured to receive resource information about uplink resources from the access device, the uplink resources being selected by the access device in accordance with the quantity of the PSP-IDs to be transmitted by the UE and used to transmit the PSP-IDs to be transmitted by the UE.

12. The SP-ID indication device according to claim 11, wherein the access request message comprises:
  a DMRS sequence, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or
  indication information indicating the quantity of the PSP-IDs to be transmitted by the UE, the indication information being transmitted through one or more data symbols in the PRACH.

13. The SP-ID indication device according to claim 12, wherein the indication information is carried in one or more QPSK symbols of the one or more data symbols in the PRACH, and/or the DMRS sequence is carried in one or more pilot symbols or the one or more data symbols in the PRACH.

14. The SP-ID indication device according to claim 11, wherein the receiver is further configured to select an interlacing unit corresponding to the quantity of the PSP-IDs to be transmitted by the UE in accordance with a predetermined correspondence between an interlacing unit number and the quantity of the PSP-IDs, wherein the transmitter is further configured to transmit the access request message to the access device through the PRACH corresponding to the selected interlacing unit.

15. The SP-ID indication device according to claim 11, wherein the receiver is further configured to receive a random access response message comprising the indication information about the uplink resources from the access device.

16. An SP-ID indication device for use in an access device, comprising a receiver, a processor, a memory and a transmitter, wherein the receiver is configured to receive an access request message transmitted by a UE through a PRACH, and the access request message is at least used to indicate the quantity of PSP-IDs to be transmitted by the UE;
  the processor is configured to execute data or instructions stored in the memory so as to select uplink resources in accordance with the quantity of the PSP-IDs to be transmitted by the UE, and the uplink resources is used to transmit the PSP-IDs to be transmitted by the UE; and
  the transmitter is configured to transmit resource information about the uplink resources to the UE.

17. The SP-ID indication device according to claim 16, wherein
  the processor is further configured to determine the quantity of the PSP-IDs to be transmitted by the UE in accordance with a DMRS sequence comprised in the access request message, a DMRS sequence group to which the DMRS sequence belongs corresponding to the quantity of the PSP-IDs to be transmitted by the UE or the DMRS sequence corresponding to the quantity of the PSP-IDs to be transmitted by the UE; and/or
  the processor is further configured to determine the quantity of the PSP-IDs to be transmitted by the UE in accordance with indication information comprised in the access request message, the indication information being used to indicate the quantity of the PSP-IDs to be transmitted by the UE and transmitted through one or more data symbols in the PRACH.

18. The SP-ID indication device according to claim 17, wherein the indication information is carried in one or more QPSK symbols of the one or more data symbols in the PRACH, and/or the DMRS sequence is carried in one or more pilot symbols or the one or more data symbols in the PRACH.

19. The SP-ID indication device according to claim 16, wherein the receiver is further configured to receive the access request message transmitted by the UE through the PRACH corresponding to an interlacing unit, and an interlacing unit number corresponds to the quantity of the PSP-IDs, and the processor is further configured to determine the quantity of the PSP-IDs to be transmitted by the UE corresponding to the selected interlacing unit in accordance with a correspondence between the interlacing unit number and the quantity of the PSP-IDs.

20. The SP-ID indication device according to claim 16, wherein the transmitter is further configured to transmit a random access response message comprising the indication information about the uplink resources to the UE.

* * * * *